April 19, 1955

L. W. ALVAREZ ET AL 2,706,793

VERTICAL DETERMINATION DEVICE

Filed May 15, 1946

*INVENTOR.*
LUIS W. ALVAREZ
BRUNO ROSSI
FREDERICK C. CHROMEY

M. O. Hayes

ATTORNEY

United States Patent Office 2,706,793
Patented Apr. 19, 1955

2,706,793

VERTICAL DETERMINATION DEVICE

Luis W. Alvarez, Berkeley, Calif., Bruno Rossi, Winchester, Mass., and Frederick C. Chromey, Philadelphia, Pa., assignors to the United States of America as represented by the Secretary of the Navy Application May 15, 1946, Serial No. 669,788

7 Claims. (Cl. 250—83.6)

This invention relates to a device for the determination of the vertical direction by means of cosmic rays.

The object of this invention is to provide a device for determining the vertical direction.

Another object is to provide a device which will maintain the vertical direction.

A further object is to provide a device giving a measure of the inclination to vertical.

It is known that the distribution of cosmic radiation incident to the earth is approximately symmetrical about the vertical direction. Actually more cosmic rays enter the earth's atmosphere from the west than from the east, known as the "East-West Effect," due to the action of the earth's magnetic field on the primary cosmic ray particles which, on the average, are positively charged. This effect is small, however, and can be accounted for, when the direction of incidence of cosmic radiation is used as a directional standard, in the same manner that one allows for the fact that a magnetic compass does not point to the geographical North Pole. The intensity of cosmic radiation decreases with an increase in the inclination to vertical, being maximum at the vertical. Thus a device sensitive to the intensity or rate of occurrence of cosmic radiation and having direcional sensitivity could be used to determine the direction of maximum radiation and so determine the vertical direction. Or two such devices could be placed with their axes of maximum sensitivity at an angle and the deviation from vertical determined by the difference between the response of the two devices.

The operation and objects of the invention will be better understood from the following description when taken with the accompanying drawings, in which.

Figure 1:
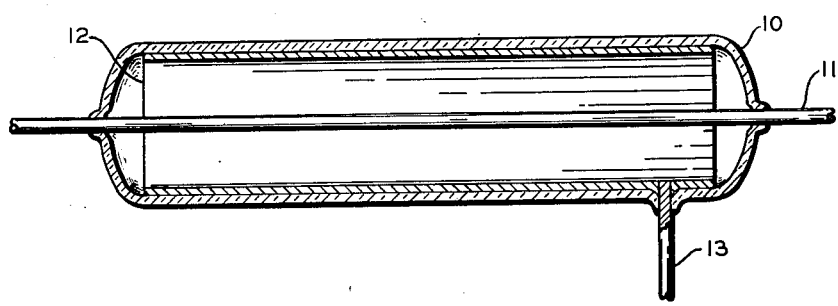
Fig. 1 is a sketch of Geiger-Mueller counter or cosmic ray counter.

Referring to Fig. 1 a cosmic ray sensitive device, known as a Geiger-Mueller counter, is shown. A cylindrical glass envelope 10 contains two conducting electrodes. A fine filament of conducting material 11 passes through the axis of the envelope 10 and forms one electrode. A second electrode is formed by a conducting layer sputtered on the inside which may be a conducting layer sputtered on the inside surface of the envelope 10. Contact is made to plate 12 through terminal 13. The space enclosed by the envelope 10 contains an inert gas at a relatively low pressure. In operation, a high voltage is placed between the filament 11 and the plate 12. This voltage is insufficient to start or maintain a current flow except when ionization of the gas occurs due to an external cause. When a cosmic ray passes through the counter it will cause ionization of the gas and a current will flow. The gas or mixture of gases enclosed in the envelope 10 is chosen to have a very short time for deionization, so a single pulse of current of short duration will flow for each cosmic ray. An electrical circuit may be used to count these current pulses and give an indication of the intensity of cosmic radiation.

Cosmic rays incident to the earth are generally considered to be quanta of energy having finite dimensions, arriving at random, and travelling at a relatively high velocity in essentially a straight line. The direction of travel of a cosmic ray may be determined with two counters. If a cosmic ray is travelling in such a direction as to pass through both counters, the counters will be discharged practically simultaneously. The simultaneous discharge may be detected with an electrical circuit known as a coincidence circuit. A count of the simultaneous discharges, as obtained by a coincidence circuit, may be used as a measure of the intensity of cosmic radiation along a line passing through the two counters. An occasional coincidence may be caused by the random simultaneous discharge of two counters by different cosmic rays, but this effect will be statistically negligible.

Figure 2:
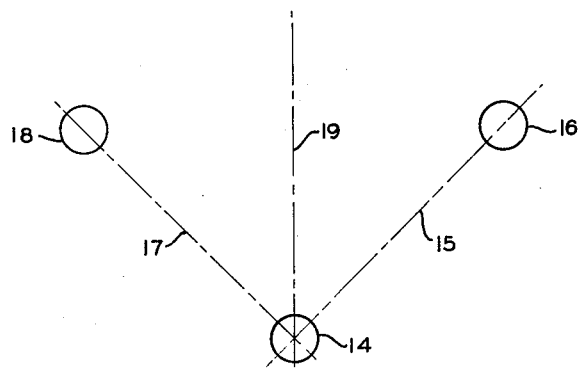
Fig. 2 is a diagram of a possible arrangement of counters for the purpose of the invention.

Referring now to Fig. 2 an arrangement of counters is shown which will detect the intensity of cosmic radiation along two lines and may be used to determine the vertical direction. A first line 15 passes through counters 14 and 16. A second line 17 passes through counter 14 and also counter 18. The arrangement of counters 14, 16, and 18 is symmetrical about a third line 19. As mentioned before, cosmic radiation is approximately symmetrical about the vertical direction, or at any rate, is of a substantially fixed deviation from the vertical at any given geographical location, which can be readily accounted for. Thus, if line 19 is vertical the average number of cosmic rays arriving along lines 15 and 17 will be equal. If line 19 is not vertical, the cosmic radiation intensities along lines 15 and 17 will differ. This difference may be made evident by coincidence intensity measurements involving the combination of counters 14 and 16 and counters 14 and 18. This difference will be a direct indication of the inclination of line 19 to the vertical.

Figure 3:
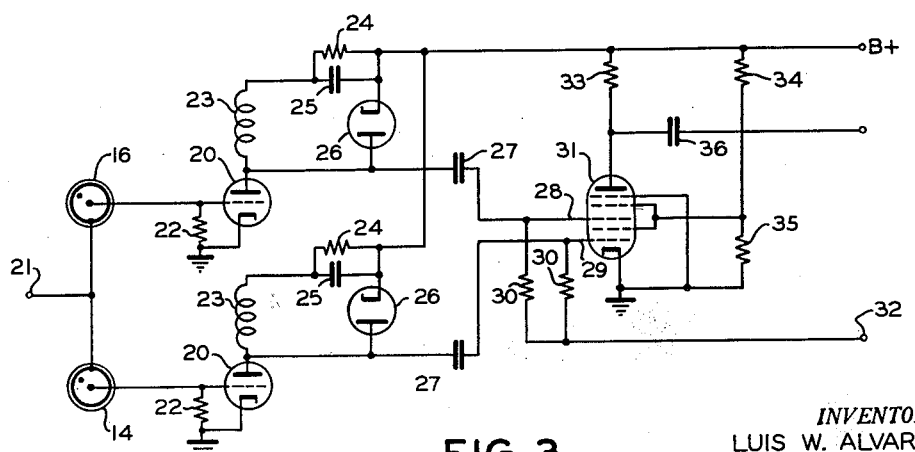
Fig. 3 is a schematic diagram of one type of coincidence circuit.

The electrical coincidence circuit, mentioned above, may be a circuit such as is shown in Fig. 3. The signal from a first counter 16 passes through a pulse sharpening amplifier to grid 28 of electron tube 31. An identical pulse sharpening amplifier receives the signal from counter 14 and applies it to grid 29 of tube 31. For brevity, only one pulse amplifier will be described in detail. The counter 16 is connected to a large negative potential at terminal 21 and to ground through resistor 22. When the counter 16 discharges a large negative voltage is produced across resistor 22. The filament of counter 16 connects to the grid of electron tube 20. The plate of tube 20 connects to a source of plate potential B+ through an inductor 23 and a parallel combination of a resistor 24 and a capacitor 25. An electron tube 26 has its plate connected to the plate of tube 20 and its cathode connected to the plate potential B+. A capacitor 27 couples from the plate of tube 20 to grid 28 of tube 31. Resistor 30 connects from grid 28 to a source of negative potential 32.

Connecting from counter 14 to grid 29 of tube 31 is a circuit identical to the one described above. The cathode and suppressor grid of tube 31 are connected to ground. The screen grid of tube 31 is connected to a suitable positive potential determined by resistors 34 and 35 which form a voltage divider between the plate potential B+ and ground. The plate of tube 31 connects to resistor 33 which in turn connects to the plate potential B+. The signal from tube 31 is coupled out through capacitor 36.

In operation of the coincidence circuit, when the counter 16 is not conducting, the grid of tube 20 is at ground potential tube 20 thereby being rendered conducting and drawing current through inductor 23 and resistor 24. The current through resistor 24 causes a voltage drop and makes the plate of tube 26 negative with respect to its cathode. Now when counter 16 is discharged, the grid of tube 20 becomes negative causing tube 20 to become non-conducting. The action of inductor 23 is to produce a large and sudden rise in potential at the plate of tube 20 when the current ceases to flow through the tube. The voltage across resistor 24 is not allowed to change rapidly due to the action of capacitor 25. Thus, when the potential rise due to the action of inductor 23 exceeds the voltage drop across resistor 24, tube 26 will conduct and stop the rise in potential. As the discharge of counter 16 is very short, tube 20 will be non-conducting for only a short period of time. Thus a sharp positive pulse of limited amplitude will occur at the plate of tube 20. This pulse is coupled to grid 28 of tube 31 by capacitor 27.

The grids 28 and 29 of tube 31 are connected to a negative voltage so tube 31 is normally non-conducting. A positive pulse applied to one grid only will not cause tube 31 to conduct. The only time tube 31 conducts is when grids 28 and 29 receive simultaneous positive pulses. This occurs only when counters 14 and 16 discharge simultaneously. When tube 31 conducts, a negative voltage is produced at the plate by the voltage drop across resistor 33.

Figure 4:
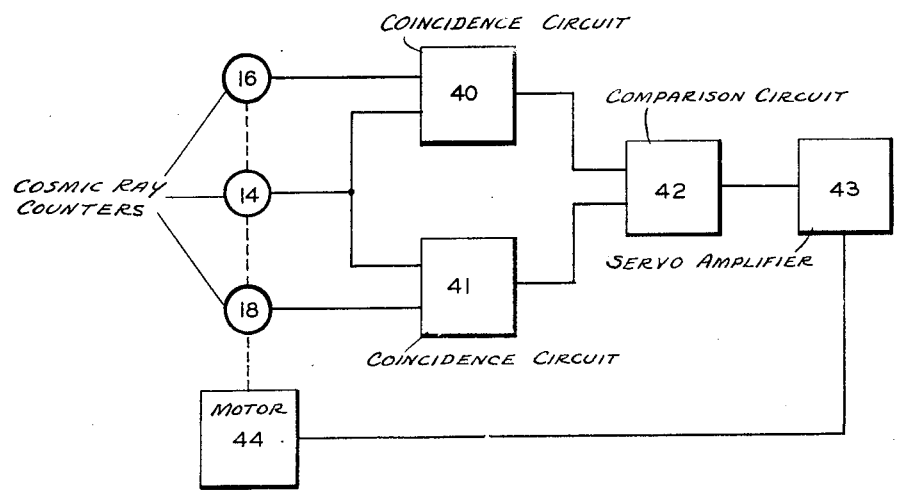
Fig. 4 is a block diagram of one embodiment of the invention.

Referring now to Fig. 4, a block diagram of a system to maintain the vertical direction using the principles explained above is shown. Counters 14, 16, and 18 are arranged in a mounting system to maintain the physical relationship described and shown in Fig. 2. The mounting system may be rotated in the vertical plane passing through the counters. Counters 14 and 16 connect to a coincidence circuit 40, which may be of the type decribed. Counters 14 and 18 connect to a second coincidence circuit 41. The coincidence circuits 40 and 41 connect to a comparison circuit 42 which may be a conventional comparison rectifier circuit sensitive to the average of the input signals. Comparison circuit 42 connects to a conventional servo system 43 operating motor 44. Motor 44 drives a mechanism to position the mounting of counters 14, 16 and 18 in a plane passing through the vertical.

In operation, the simultaneous discharges of counters 14 and 16 and counters 14 and 18 are detected in coincidence circuits 40 and 41 respectively. The number of pulses per unit time from coincidence circuits 40 and 41 are compared in comparison circuit 42, the output of which is proportional to the difference in the signals. This output controls a conventional servo system amplifier 43 connected to motor 44. When the number of pulses from the coincidence circuits 40 and 41 are equal the outputs from comparison circuit 42 and servo amplifier 43 will be minimum and motor 44 will not run. This is the condition which will exist if the line 19 (Fig. 2) is vertical. If line 19 is not vertical, the number of pulses from coincidence circuits 40 and 41 will not be equal and the outputs from comparison circuit 42 and servo amplifier 43 will be such as to cause motor 44 to run. The rotation of motor 44 will be such as to cause the mounting of counters 14, 16, and 18 to move in a direction to place line 19 on the vertical.

As cosmic radiation arrives at random, the pulses from coincidence circuits 40 and 41 must be averaged over a relatively large number of pulses. This function is accomplished in the comparison circuit 42. The accuracy of the system as well as the stability will be dependent upon the length of this averaging period.

Figure 5:
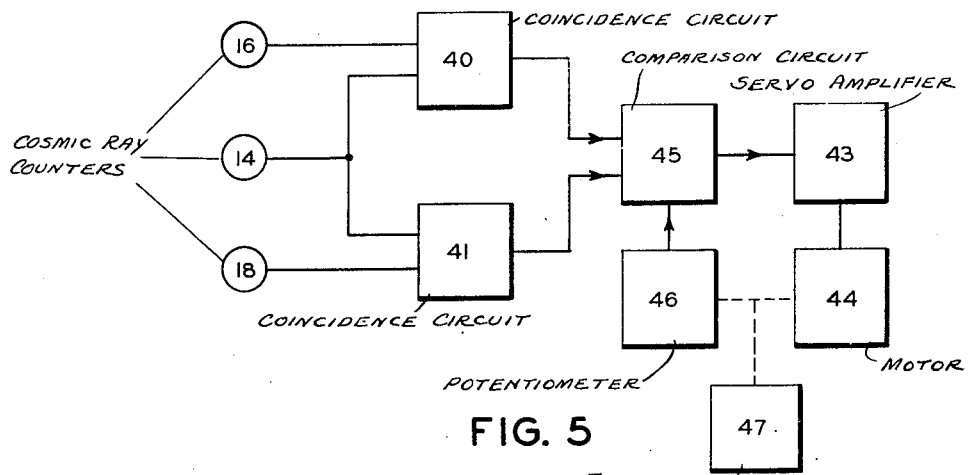
Fig. 5 is a block diagram of another arrangement of the invention.

Fig. 5 shows a block diagram of a circuit using the principle described to give an indication of the inclination to vertical. The counters 14, 16 and 18, coincidence circuits 40 and 41, servo amplifier 43, and motor 44 are identical to those described above. A comparison circuit 45 is similar to that described above, but has provision for a feedback input. Motor 44 drives a potentiometer 46 and an indicator 47. The output of potentiometer 46 provides feedback input to comparison circuit 45.

In operation, any displacement of the line 19 (Fig. 2) of the counters 14, 16, and 18, from vertical will cause an inequality in the inputs to comparison circuit 45. This will cause motor 44 to rotate through the action of comparison circuit 45 and servo amplifier 43. Rotation of motor 44 will cause a change in the output of potentiometer 46. The output of potentiometer 46 acts to cancel the difference in input signals to comparison circuit 45. When motor 44 has rotated a certain amount the output of potentiometer 46 will be just sufficient to cancel the difference in input signals to comparison circuit 45. The output of comparison circuit 45 will then be minimum and motor 44 will stop. The amount of rotation of motor 44 will be proportional to the inclination of the line 19 of counters 14, 16, and 18 to the vertical. The indicator 47 connected to the shaft of motor 44 may be calibrated to read this inclination to the vertical.

The systems described above will determine the vertical only when the plane of the counters is restricted to a vertical plane. If the plane of the counters is not vertical the system will determine a vertical plane. The plane at right angles to the plane of the counters and passing through the line 19 (Fig. 2) will be the vertical plane. To accurately determine the vertical it would be necessary to use two systems as shown in Fig. 4 operating with the plane of the counters of the first system at right angles to the plane of the counters of the second system and the counters arranged symmetrically about the line 19.

As the accuracy of the system will depend upon the total number of cosmic rays counted per unit time, it would be desirable to have the area of the counters as large as possible. This may best be done by using groups of several counters connected in parallel in place of each of the single counters shown and described.

In the above description the slight excess of cosmic ray particles entering the earth's atmosphere from the west as compared to the east has been ignored. It will be apparent that the necessary allowance for this east-west effect may be made by adjustment of the averaging or comparison circuits.

The basic invention is the use of cosmic ray counters to determine the vertical direction from the symmetrical distribution of cosmic ray intensity about the vertical. Several systems have been disclosed to utilize this invention and it is to be understood that this invention is not to be limited to the details of construction and operation illustrated in the accompanying drawings and described above, except as appears hereafter in the claims.

What is claimed is:

1. Apparatus utilizing cosmic radiation for the accurate determination of the vertical comprising, an assembly of first, second and third cosmic ray counters disposed at the vertices of a triangle, said triangle being disposed in a substantially vertical plane, said triangle being symmetrical about a line in said vertical plane passing through said first counter, said assembly being mounted to rotate in said vertical plane about a point on said line of symmetry, means for comparing the number of cosmic rays striking said first and second counters and said first and third counters, and means coupled to said comparing means and responsive to the output signal thereof being operative to reduce the output of said comparing means to zero.

2. Apparatus utilizing cosmic radiation for the accurate determination of the vertical comprising, a normally balanced circuit, an assembly of first, second and third cosmic ray counters disposed at the vertices of a triangle, said triangle being disposed in a substantially vertical plane, said triangle being symmetrical about a line in said vertical plane passing through said first counter, means coupling said counters to said normally balanced circuit, said balanced circuit being rendered unbalanced when said line of symmetry is displaced from the vertical, and means responsive to the unbalance of said circuit for rotating said counter assembly in said vertical plane about a point on said line of symmetry to restore said circuit to balance.

3. Apparatus for the determination of the vertical utilizing the substantially symmetrical distribution of cosmic ray intensity incident to the earth from the vertical direction, said apparatus comprising, an assembly of first, second and third cosmic ray counters positioned at the vertices of a triangle disposed in a substantially vertical plane, said triangle being symmetrical about a line in said vertical plane passing through said first counter, circuit means including a pair of coincidence circuits coupled to said counters for comparing the cosmic ray intensity from a direction defined by the side of said triangle including said first and second counters with the intensity from a direction defined by the side of said triangle including said first and third counters, and a motor coupled to said circuit means arranged to rotate said counter assembly in said vertical plane about a point on said line of symmetry until the cosmic ray intensity from the two above-defined directions are equal, said line thereby being coincident with the vertical.

4. Apparatus for the determination of the vertical utilizing the substantially symmetrical distribution of cosmic ray intensity incident to the earth from the vertical direction, said apparatus comprising, an assembly of first, second and third cosmic ray counters positioned at the vertices of a triangle disposed in a substantially vertical plane, said triangle being symmetrical about a line in said vertical plane passing through said first counter, first and second coincidence circuits respectively coupled to said first and second counters and said first and third counters, means coupled to said coincidence circuits for comparing the outputs thereof, means coupled to said comparing means for generating a signal proportional to the difference of the outputs of said coincidence circuits, and a motor connected to be energized by said signal and mechanically arranged to rotate said counter assembly in said vertical plane about a point on said line of symmetry until the outputs of said coincidence circuits are equal and said signal is reduced to zero whereby said motor is stopped and said line of symmetry is coincident with the vertical.

5. Apparatus for the determination of the vertical utilizing the substantially symmetrical distribution of cosmic ray intensity incident to the earth from the vertical direction, said apparatus comprising, an assembly of first, second and third cosmic ray counters positioned at the vertices of a triangle disposed in a substantially vertical plane, said triangle being symmetrical about a line in said vertical plane passing through said first counter, first and second coincidence circuits respectively coupled to said first and second counters and said first and third counters, a comparison circuit coupled to said coincidence circuits for producing a signal proportional to the difference of the outputs of said coincidence circuits, a servo amplifier and a motor, said servo amplifier being coupled between said comparison circuit and said motor for energizing said motor with said signal, said motor being mechanically coupled to said counter assembly to rotate said assembly in said vertical plane about a point on said line of symmetry to orient said assembly to a position where the outputs of said coincidence circuits are equal whereby said motor is stopped and said line of symmetry is coincident with the vertical.

6. Apparatus for the determination of the vertical utilizing the substantially symmetrical distribution of cosmic ray intensity incident to the earth from the vertical direction, said apparatus comprising, an assembly of first, second and third cosmic ray counters positioned at the vertices of a triangle disposed in a substantially vertical plane, said triangle being symmetrical about a line in said vertical plane passing through said first counter, first and second coincidence circuits respectively coupled to said first and second and said first and third counters, means coupled to said coincidence circuit for generating a signal proportional to the difference of the outputs of said coincidence circuits, a motor connected to be energized by said signal, a potentiometer connected to introduce a voltage into said signal generating means, said motor being mechanically coupled to said potentiometer and arranged to rotate said potentiometer upon energization until said signal is reduced to zero, and an indicator mechanically coupled to said potentiometer to indicate the rotation thereof necessary to reduce said signal to zero, said rotation being an indication of the inclination of said line of symmetry from the vertical.

7. Apparatus for the determination of the vertical utilizing the substantially symmetrical distribution of cosmic ray intensity incident to the earth from the vertical direction, said apparatus comprising, an assembly of first, second and third cosmic ray counters positioned at the vertices of a triangle disposed in a substantially vertical plane, said triangle being symmetrical about a line in said vertical plane passing through said first counter, first and second coincidence circuits respectively coupled to said first and second and said first and third counters, a comparison circuit coupled to said coincidence circuits for producing a signal proportional to the difference of the outputs of said coincidence circuits, a servo amplifier, a motor, said servo amplifier being coupled between said comparison circuit and said motor for energizing said motor with said signal, a potentiometer connected to introduce a voltage signal to said comparison circuit, said motor being mechanically coupled to said potentiometer and arranged to rotate said potentiometer in response to said signal to vary said voltage signal in the proper direction to reduce said signal to zero, and an indicator mechanically coupled to said potentiometer to indicate the rotation thereof necessary to reduce said signal to zero, said rotation being an indication of the inclination of said line of symmetry from the vertical.

References Cited in the file of this patent

UNITED STATES PATENTS

| | | |
|---|---|---|
| 2,334,085 | Graves et al. | Nov. 9, 1943 |
| 2,399,640 | Kettering | May 7, 1946 |
| 2,478,956 | Webber | Aug. 16, 1949 |

OTHER REFERENCES

Atomic Physics, Physics Staff of the University of Pittsburgh, published by John Wiley & Sons, 1937 edition, pp. 293–299.